United States Patent [19]

Irick, Jr. et al.

[11] 4,166,803

[45] Sep. 4, 1979

[54] HETEROCYCLIC BENZOATE ULTRAVIOLET STABILIZERS AND THEIR USE IN ORGANIC COMPOSITIONS

[75] Inventors: Gether Irick, Jr.; James C. Ownby; Richard H. S. Wang, all of Kingsport, Tenn.

[73] Assignee: Eastman Kodak Company, Rochester, N.Y.

[21] Appl. No.: 868,085

[22] Filed: Jan. 9, 1978

[51] Int. Cl.$^2$ .................. C07D 401/10; C08K 5/34; C08K 5/35; C08K 5/47

[52] U.S. Cl. .................. 252/402; 260/45.8 N; 260/45.8 NT; 260/45.8 NZ; 260/45.8 SN; 252/403; 252/405; 252/406; 260/398.5; 260/800; 546/196; 546/198; 546/199; 546/201; 546/202

[58] Field of Search .......... 260/45.8 NP, 293.88 (U.S. only), 260/293.57, 293.58, 293.59, 293.6, 293.61 (U.S. only), 398.5; 252/402, 403

[56] References Cited

U.S. PATENT DOCUMENTS

| | | | |
|---|---|---|---|
| 2,506,605 | 5/1950 | Martin et al. .................. | 260/293.88 |
| 3,408,357 | 10/1968 | Kuhnis et al. .................. | 260/293.88 |
| 3,705,166 | 12/1972 | Murayama et al. ............. | 260/293.88 |
| 3,840,494 | 10/1974 | Murayama et al. .......... | 260/45.8 NP |
| 4,014,887 | 3/1977 | Randell et al. .................. | 260/293.88 |
| 4,075,165 | 2/1978 | Soma et al. ..................... | 260/293.88 |

*Primary Examiner*—Melvyn I. Marquis
*Assistant Examiner*—R. A. White
*Attorney, Agent, or Firm*—Clyde L. Tootle; Daniel B. Reece, III

[57] ABSTRACT

The invention relates to heterocyclic benzoate compounds which have been found to be effective ultraviolet stabilizers. The invention also relates to ultraviolet degradable organic compositions containing an amount of a heterocyclic benzoate composition to prevent such degradation. These stabilizers are effective in the presence of other additives commonly employed in polymeric compositions including, for example, pigments, colorants, fillers, reinforcing agents and the like. These ultraviolet stabilizers may be incorporated into the organic compositions such as polymers by adding to the polymer melt or dissolved in the polymer dope, coated on the exterior of the shaped or molded article, film or extruded fiber.

28 Claims, No Drawings

HETEROCYCLIC BENZOATE ULTRAVIOLET STABILIZERS AND THEIR USE IN ORGANIC COMPOSITIONS

This invention relates to heterocyclic benzoate ultraviolet stabilizers and their use in organic compositions. More particularly, the invention relates to heterocyclic benzoate compositions and the stabilization of ultraviolet degradable organic compositions against deterioration resulting from the exposure to such radiations with heterocyclic benzoate compositions.

The degradative effects of ultraviolet light on various organic compositions is well known in the art. The photo-deterioration or degradation is of particular concern with organic photo-degradable compositions which are exposed to ultraviolet light, such as sunlight, for long periods of time. One group of such photo-degradable organic compositions is polymeric compositions such as polyolefins, polyesters, polyurethanes and the like. On exposure to sunlight for extended periods of time, these polymeric compositions degrade and their physical properties are reduced to render the polymeric composition less useful for most applications. Therefore, considerable effort has been directed to providing a solution to the photo-degradation problem of polymeric compositions. As a result of this effort, there have been discovered many additives and stabilizers which improve the stability of polymeric compositions.

Moreover, various additives and stabilizers exhibit the power to absorb electromagnetic radiation within the band of 2900 to 4000 A. and, when incorporated in various plastic materials such as transparent sheets, the resultant sheet acts as a filter for all the radiation passing through and will transmit only such radiations as are not absorbed by the sheet and/or the absorbing agent. It is thus possible to screen out undesirable radiations and utilize the resulting transparent sheet as a filter in many technical and commercial applications, such as wrappings for food products and the like.

While there are many additives, stabilizers and mixtures thereof which are known in the art to improve the ultraviolet light stability of organic compositions, there is a need in the art for more efficient and effective stabilizers to prevent the photo-degradation of organic compositions susceptible to photo-degradation. Therefore, to provide a more effective and efficient ultraviolet stabilizer for organic compositions susceptible to such degradation would be an advance in the state of the art.

It is, therefore, an object of the present invention to provide more effective and efficient ultraviolet light stabilizer compositions.

Another object of the present invention is to provide useful compositions characterized by improved resistance to ultraviolet degradation and deterioration.

It is still another object of the present invention to provide compositions containing heterocyclic benzoate compositions which are resistant to ultraviolet degradation.

It is a still further object of this invention to provide processes for improving the resistance of organic materials to deterioration and degradation by actinic radiation and especially ultraviolet radiation.

It is a still further object of this invention to provide compositions and processes for improving the resistance of organic materials to deterioration and degradation by actinic radiations, including short wave-length visible radiations.

Further objects and advantages of the invention will be apparent to those skilled in the art from the accompanying disclosure and claims.

In accordance with the present invention, organic compositions are provided which are useful as ultraviolet stabilizers or ultraviolet screening agents. These organic compositions consist of heterocyclic-substituted phenyl group containing compositions connected through a carboxyl group to an ortho-alkylated piperidinyl ring. The organic compositions of the present invention are piperidinyl esters of heterocyclic aromatic acids. The organic compositions of the present invention have the following structure:

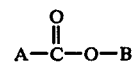

wherein
A is a group having the structure

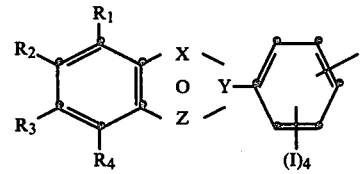

wherein
X and Y are a carbon atom or a nitrogen atom;
Z is an oxygen atom, a sulfur atom, a nitrogen atom, or a nitrogen atom containing a hydrogen atom or a substituted or unsubstituted lower alkyl group containing 1 to 12 carbon atoms;
$R_1$, $R_2$, $R_3$ and $R_4$ are hydrogen, lower alkyl, substituted lower alkyl, cycloalkyl, substituted cycloalkyl, aryl, substituted aryl, lower alkylaryl, arylsubstituted-aryl, chloro, bromo, alkoxy, substituted amino, cyano, and the substituents $R_1$ and $R_2$, $R_2$ and $R_3$, and $R_3$ and $R_4$, combined with the carbon atoms to which they are attached, are joined alkylene groups completing a carbocyclic ring, which ring can also be substituted with one or more of the substituents listed above for $R_1$, $R_2$, $R_3$ and $R_4$.

I is a substituent listed above for $R_1$, $R_2$, $R_3$ and $R_4$ and is present on all positions of the benzenoid ring, except the carbon atom attached to the Y substituent and the carbon atom attached to the carboxyl group connecting the heterocyclic aromatic A group with the aromatic B group. The carbonyl connecting group is attached to the benzenoid ring in either the meta or para position from the carbon atom connected to the Y substituent. The I substituents can all be one of the substituents listed above or different listed substituents.

The group B is a group having the formula

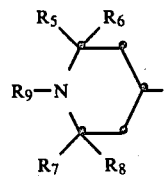

$R_5$ and $R_6$ are each alkyl having 1–6 carbons; $R_7$ and $R_8$ are each alkyl having 1–6 carbons or together with the carbon to which they are bound form a cyclopentyl or cyclohexyl ring, which is unsubstituted or substituted with a methyl group; and $R_9$ is hydrogen, oxy, alkyl having 1 to 12 carbon atoms, β-methoxyethyl, alkenyl having 3 to 4 carbon atoms, propargyl, benzyl or alkyl substituted benzyl.

Suitable heterocyclic A groups having the structure

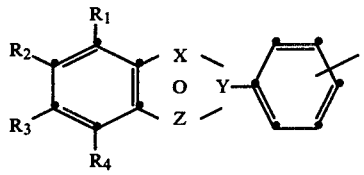

are, for example substituted and unsubstituted benzoxazoles, benzotriazoles, benzothiazoles, benzimidazoles, and indoles.

Examples of suitable benzoxazole moieties are those having the formula

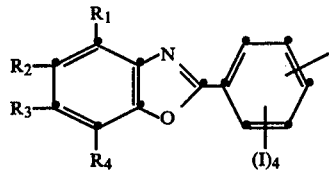

such as 4-(5,6-dimethyl-2-benzoxazolyl)phenyl, 4-(2-benzoxazolyl)-2-chlorophenyl, 3-(5-chloro-2-benzoxazolyl)phenyl, 4-(2-benzoxazolyl)phenyl, and 3-(2-benzoxazolyl)phenyl.

Examples of suitable benzotriazole moieties are those having the formula

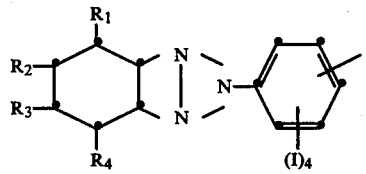

such as 4-(5-chloro-2H-benzotriazol-2-yl)phenyl, 4-(2H-benzotriazol-2-yl)phenyl, 4-(5-methoxy-2H-benzotriazol-2-yl)phenyl, and 3-(2H-benzotriazol-2-yl)phenyl.

Examples of suitable benzothiazole moieties are those having the formula

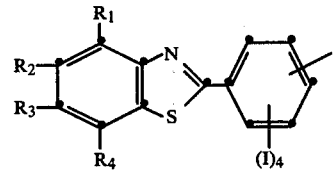

such as 4-(5,6-dimethyl-2-benzothiazolyl)phenyl, 4-(2-benzothiazolyl)2-chlorophenyl, 3-(5-chloro-2-benzothiazolyl)phenyl, 4-(2-benzothiazolyl)phenyl, and 3-(2-benzothiazolyl)phenyl.

Examples of suitable benzimidazole moieties are those having the formula

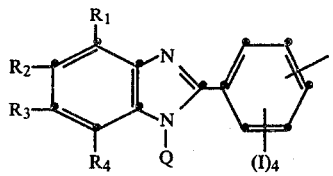

wherein Q is hydrogen or a substituted or unsubstituted lower alkyl group containing 1 to 12 carbon atoms. Such benzimidazole moieties are, for example, 4-(5,6-dimethyl-2-benzimidazolyl)phenyl, 4-(2-benzimidazolyl)-2-chlorophenyl, 3-(5-chloro-2-benzimidazolyl)phenyl, 4-(1-methyl-2-benzimidazolyl)phenyl, 4-(1-ethyl-5-chloro-2-benzimidazolyl)phenyl.

Examples of suitable indole moieties are those having the formula

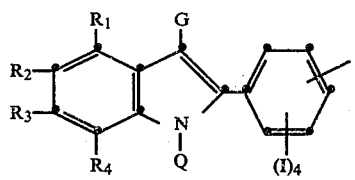

wherein G is the same as $R_1$ and Q is hydrogen or a substituted or unsubstituted lower alkyl group containing 1 to 12 carbon atoms. Such suitable indole moieties are, for example, 3-(1-ethyl-3-cyano-2-indolyl)phenyl, 3-(5-chloro-2-indolyl)phenyl, 3-(1-methyl-2-indolyl)phenyl, 3-(3-methyl-2-indolyl)phenyl, 3-(3-chloro-2-indolyl)phenyl, 3-(5-acetamido-2-indolyl)phenyl, 3-(2-indolyl)phenyl, 4-(1-ethyl-2-indolyl)phenyl, 4-(3-cyano-2-indolyl)phenyl, 4-(5-methoxy-2-indolyl)phenyl, 4-(1-methyl-2-indolyl)phenyl, 4-(3-methyl-5-phenyl-2-indolyl)phenyl, 4-(3,5-dichloro-2-indolyl)phenyl, 4-(2-indolyl)phenyl.

Suitable B groups are 2,2,6,6-tetramethylpiperidin-4-yl, 2,2,6,6-pentamethylpiperidin-4-yl, 1-oxo-2,2,6,6-tetramethylpiperidin-4-yl and the like.

The heterocyclic compositions can be added to organic compositions which are susceptible to ultraviolet degradation. Such compositions include, for example, polymeric compositions such as polyester fiber and moldable compositions, such as poly(ethylene terephthalate) poly(tetramethylene terephthalate) and the like; white pigmented polyolefins such as, for example, $TiO_2$ pigmented high, medium and low density polyethylene and polypropylene; and polyurethanes.

The heterocyclic benzoate compositions as effective ultraviolet stabilizers or screening agents are generally used in an amount of from 0.01 to 10%, by weight, based on the weight of the organic material to which they are added. While a detectable amount of ultraviolet screening and stabilization may be obtained with amounts less than 0.01%, this amount of stabilization or screening would be of little practical utility in a commercial application. Moreover, while amounts greater than 10%, by weight, provide effective ultraviolet stability and screening, such concentrations are undesirable because of cost and the deleterious effect which such concentrations may have on the mechanical properties of the organic composition in which the stabilizer is incorporated. Preferably, the stabilizer is used in an amount of from about 0.1 to about 3%, by weight. For example, an amount of 0.5%, by weight, of the stabilizer effectively stabilizes polytetramethylene terephthalate plastic compositions.

The ultraviolet stabilized organic compositions containing the stabilizers of the present invention may also contain other additives, pigments, colorants, stabilizers and the like. For example, polymeric compositions, such as polyesters, polyurethanes and polyolefins, may also contain and generally do contain other additives such as white or colored pigments or colorants, antioxidants, plasticizers, flow aids, processing aids, polymeric modifiers and the like.

These heterocyclic benzoate ultraviolet stabilizers may be incorporated into organic compositions by melt-blending or may be added onto the surface of an organic plastic material prior to being molded into a suitable object, or added to the surface of the molded object. These materials can also be added to coatings and the like which can be applied to the surface of a molded object.

This invention will be further illustrated by the following examples although it will be understood that these examples are included merely for purposes of illustration and are not intended to limit the scope of the invention.

EXAMPLE 1

2,2,6,6-Tetramethyl-4-piperidinyl 4-(2-benzoxazolyl)-benzoate, (I) can be prepared by the following procedure:

A mixture of 2,2,6,6-tetramethylpiperidin-4-ol (0.105 mole), triethyl amine (0.125 mole) and 4-(2-benzoxazolyl)benzoyl chloride (0.1 mole) in 500 ml of ethylene chloride was refluxed for 10 hours. After cooling and filtering off amine salt, product I was obtained by adding heptane to the filtrate (mp. 190°-2° C., yield 50%).

EXAMPLE 2

2,2,6,6-Tetramethyl-4-piperidinyl 4-(2-benzotriazolyl)benzoate, (II) can be similarly prepared by the procedure of Example 1.

EXAMPLE 3

2,2,6,6-tetramethyl-4-piperidinyl 4-(2-benzothiazolyl)benzoate, (III) can be similarly prepared by the procedure of Example 1.

EXAMPLE 4

2,2,6,6-Tetramethyl-4-piperidinyl 4-(2-benzimidazolyl)benzoate, (IV) can be similarly prepared by the procedure of Example 1.

EXAMPLE 5

2,2,6,6-Tetramethyl-4-piperidinyl 4-(2-indolyl)benzoate, (V) can be similarly prepared by the procedure of Example 1.

EXAMPLE 6

The ultraviolet stabilization provided by the heterocyclic benzoates of the present invention is shown in poly(tetramethylene terephthalate) in Tables 1, $TiO_2$-pigmented polypropylene in Table 2, and polyurethane elastomers in Table 3.

Table 1

Weathering Data for Stabilizers in Poly(tetramethylene terephthalate), in Uvatest

| Stabilizer (0.5% by Wt.) | FWIS (Flatwise Impact Strength) | | |
|---|---|---|---|
| | Initial | 2 Weeks Exposure | 3 Weeks Exposure |
| Control (no stabilizer) | 17 | 1 | 1 |
| 2,2,6,6-Tetramethyl-4-piperidinyl 4-(2-benzoxazolyl)benzoate | 18 | 18 | 19 |
| 2,2,6,6-Tetramethyl-4-piperidinyl 4-(2-benzotriazolyl)benzoate | 17 | 17 | 16 |
| 2,2,6,6-Tetramethyl-4-piperidinyl 4-(2-benzothiazolyl)benzoate | 18 | 19 | 17 |
| 2,2,6,6-Tetramethyl-4-piperidinyl 4-(2-benzimidazolyl)benzoate | 19 | 19 | 18 |
| 2,2,6,6-Tetramethyl-4-piperidinyl 4-(2-indolyl)benzoate | 17 | 17 | 15 |
| * Tinuvin 770 | 18 | 12 | 2 |

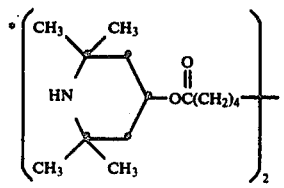

Table 2

Typical Weathering Data for Stabilizers in 5-Mil $TiO_2$-Pigmented Polypropylene Film Exposed in Uvatest

| Stabilizer (0.5% by Wt.) | Time to Embrittlement (Hours) |
|---|---|
| Control (no stabilizer) | 300 |
| 2,2,6,6-Tetramethyl-4-piperidinyl 4-(2-benzoxazolyl)benzoate | 3000 |
| Tinuvin 770 | 3000 |

Table 3

Typical Weathering Data for Stabilizers in Polyurethane Elastomers Exposed in QUV

| Stabilizer (1% by Wt.) | Exposure in QUV After 500 Hours (CDM Color) | |
|---|---|---|
| | Yellowness (+b) | Darkness (Rd) |
| None | 32.3 | 32.3 |
| 2,2,6,6-Tetramethyl-4-piperidinyl 4-(2-benzoxazolyl)benzoate | 29.3 | 23.0 |
| Tinuvin 770/Tinuvin 328 (50:50) | 29.7 | 25.5 |

These piperidinyl esters of heterocyclic aromatic acid compositions find particular utility as ultraviolet stabilizers in organic compositions requiring ultraviolet stability. Such compositions include polymeric compositions such as, for example, polyester fiber and molding compositions, poly-α-olefins, polyamides, acrylics, polyurethanes and the like, as well as molded or shaped articles, film and coatings formed from such materials, and the like. Such compositions also include natural and synthetic rubbers, such as natural rubber, as well as organic materials such as oils, fats, and unsaturated organic materials and materials having such materials contained therein such as paints, varnishes, cosmetics and the like.

The invention has been described in detail with particular reference to preferred embodiments thereof, but it will be understood that variations and modifications can be effected within the spirit and scope of the invention.

We claim:

1. Piperidinyl esters of heterocyclic aromatic acids having the formula:

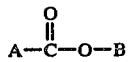

wherein

A is a group having the structure

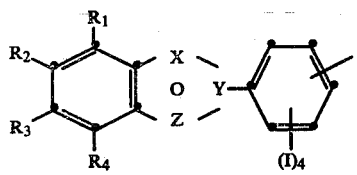

wherein

X and Y are a carbon atom or a nitrogen atom;

Z is an oxygen atom, a sulfur atom, a nitrogen atom, or a nitrogen atom containing a hydrogen atom or an unsubstituted or substituted lower alkyl group having 1 to 12 carbon atoms;

$R_1$, $R_2$, $R_3$ and $R_4$ are hydrogen, chloro, bromo, lower alkyl, substituted lower alkyl, cycloalkyl, substituted cycloalkyl, aryl, substituted aryl, lower alkylaryl, aryl-substituted-aryl, alkoxy, substituted amino, cyano, and the substituents $R_1$ and $R_2$, $R_2$ and $R_3$, and $R_3$ and $R_4$ combined with the carbon atoms to which they are attached are joined alkylene groups completing a carbocyclic ring, which ring can also be substituted with one or more of the substituents listed above for $R_1$, $R_2$, $R_3$ and $R_4$;

I is the same as $R_1$, $R_2$, $R_3$ and $R_4$ and is present on all positions of the benzenoid ring, except the carbon atom attached to the Y atom and the carbon atom attached to the carboxyl group connecting the heterocyclic aromatic A group with the B group, said carbonyl connecting group being attached to the benzenoid ring in either the meta or para position from the carbon atom connected to the Y atom; and B is a group having the formula

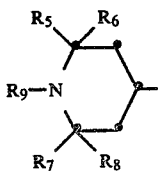

wherein $R_5$ and $R_6$ are each alkyl having 1–6 carbons; $R_7$ and $R_8$ are each alkyl having 1–6 carbons or together with the carbon to which they are bound form a cyclopentyl or cyclohexyl ring, which is unsubstituted or substituted with a methyl group; and $R_9$ is hydrogen, oxyl, alkyl having 1 to 12 carbon atoms, β-methoxyethyl, alkenyl having 3 or 4 carbon atoms, propargyl, benzyl or alkyl substituted benzyl.

2. Piperidinyl esters according to claim 1 wherein X is a carbon atom.

3. Piperidinyl esters according to claim 1 wherein X is a nitrogen atom.

4. Piperidinyl esters according to claim 2 wherein Y is a carbon atom.

5. Piperidinyl ester according to claim 3 wherein Y is a nitrogen atom.

6. Piperidinyl ester according to claim 3 wherein Y is a carbon atom.

7. Piperidinyl esters according to claim 6 wherein Z is a sulfur atom.

8. Piperidinyl esters according to claim 5 wherein Z is a nitrogen atom.

9. Piperidinyl esters according to claim 6 wherein Z is a nitrogen atom containing hydrogen or a substituted or unsubstituted lower alkyl group containing 1 to 12 carbon atoms.

10. Piperidinyl esters according to claim 6 wherein Z is an oxygen atom.

11. Piperidinyl ester according to claim 10 having the formula:

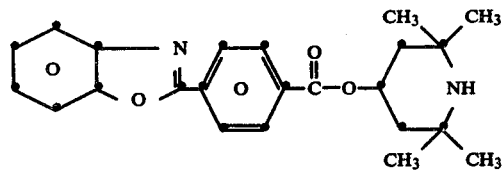

12. Piperidinyl ester according to claim 10 having the formula:

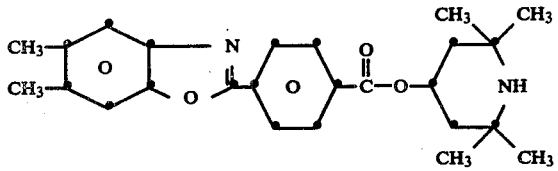

13. Piperidinyl ester according to claim 10 having the formula:

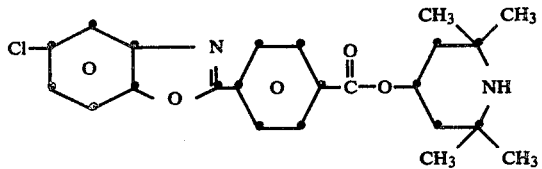

14. Piperidinyl ester according to claim 10 having the formula:

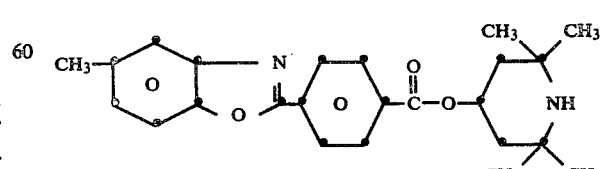

15. Piperidinyl ester according to claim 10 having the formula:

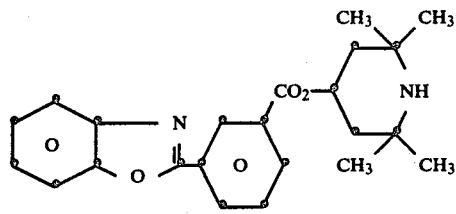

16. Piperidinyl ester according to claim 10 having the formula:

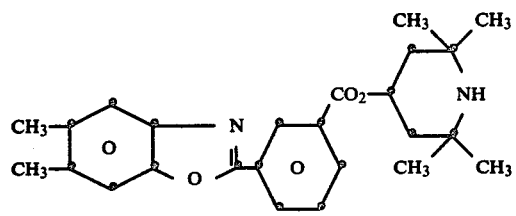

17. Piperidinyl ester according to claim 10 having the formula:

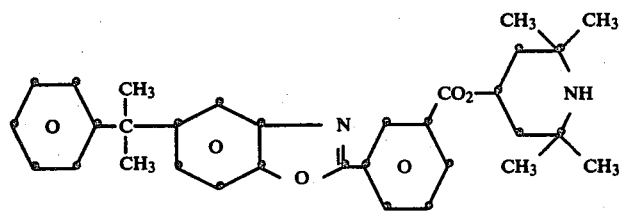

18. Piperidinyl ester according to claim 10 having the formula:

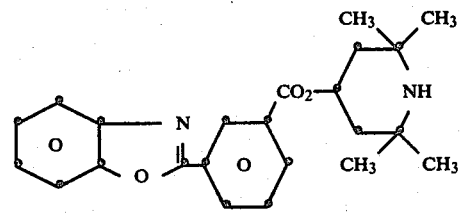

19. Piperidinyl ester according to claim 8 having the formula:

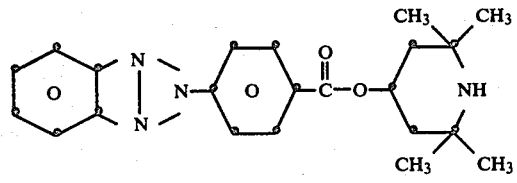

20. Piperidinyl ester according to claim 8 having the formula:

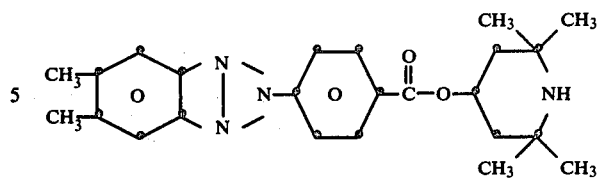

21. Piperidinyl ester according to claim 8 having the formula:

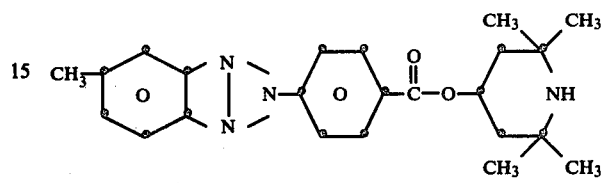

22. Piperidinyl ester according to claim 8 having the formula:

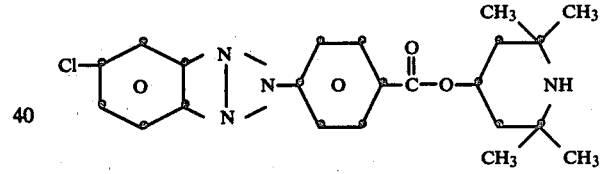

23. Piperidinyl ester according to claim 8 having the formula:

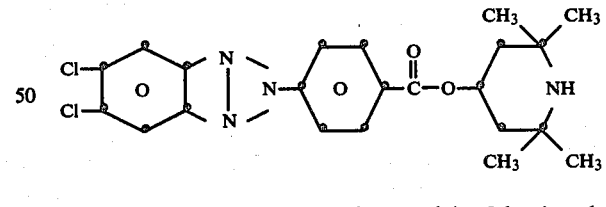

24. Piperidinyl ester according to claim 8 having the formula:

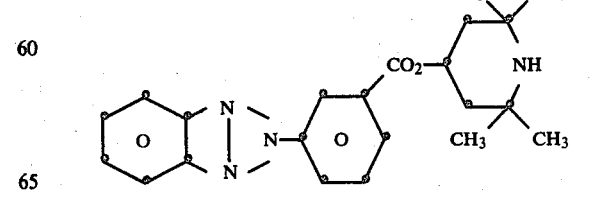

25. Piperidinyl ester according to claim 8 having the formula:

26. Piperidinyl ester according to claim 8 having the formula:

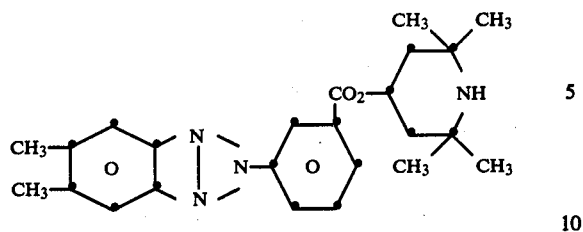

27. Piperidinyl ester according to claim 8 having the formula:

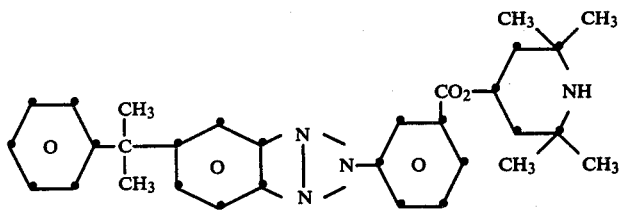

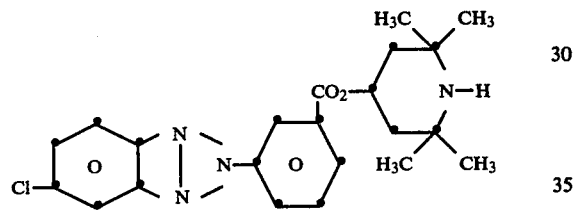

28. An organic composition susceptible to ultraviolet light degradation stabilized against such degradation with a stabilizing amount of at least one piperidinyl ester having the formula:

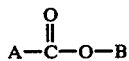

wherein
A is a group having the structure

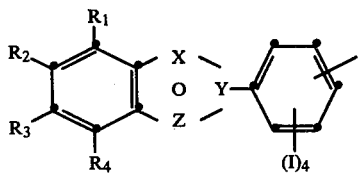

wherein
X and Y are a carbon atom or a nitrogen atom;
Z is an oxygen atom, a sulfur atom, a nitrogen atom, or a nitrogen atom containing a hydrogen atom or an unsubstituted or substituted lower alkyl group having 1 to 12 carbon atoms;
$R_1$, $R_2$, $R_3$ and $R_4$ are hydrogen, chloro, bromo, lower alkyl, substituted lower alkyl, cycloalkyl, substituted cycloalkyl, aryl, substituted aryl, lower alkylaryl, aryl-substituted-aryl, alkoxy, substituted amino, cyano, and the substituents $R_1$ and $R_2$, $R_2$ and $R_3$, and $R_3$ and $R_4$ combined with the carbon atoms to which they are attached are joined alkylene groups completing a carbocyclic ring, which ring can also be substituted with one or more of the substituents listed above for $R_1$, $R_2$, $R_3$ and $R_4$;
I is the same as $R_1$, $R_2$, $R_3$ and $R_4$ and is present on all positions of the benzenoid ring, except the carbon atom attached to the Y atom and the carbon atom attached to the carboxyl group connecting the heterocyclic aromatic A group with the B group, said carbonyl connecting group being attached to the benzenoid ring in either the meta or para position from the carbon atom connected to the Y atom; and
B is a group having the formula

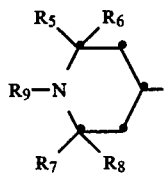

wherein
$R_5$ and $R_6$ are each alkyl having 1–6 carbons; $R_7$ and $R_8$ are each alkyl having 1–6 carbons or together with the carbon to which they are bound form a cyclopentyl or cyclohexyl ring, which is unsubstituted or substituted with a methyl group; and $R_9$ is hydrogen, oxyl, alkyl having 1 to 12 carbon atoms, β-methoxyethyl, alkenyl having 3 or 4 carbon atoms, propargyl, benzyl or alkyl substituted benzyl.

* * * * *

UNITED STATES PATENT AND TRADEMARK OFFICE
CERTIFICATE OF CORRECTION

PATENT NO. : 4,166,803
DATED : September 4, 1979
INVENTOR(S) : Gether Irick, Jr., James C. Ownby, Richard H.S. Wang It is certified that error appears in the above-identified patent and that said Letters Patent are hereby corrected as shown below:

Column 8, line 9, "ester" should read ——esters——.

Column 8, line 11, "ester" should read ——esters——.

Column 8, lines 25-33, the formula should read

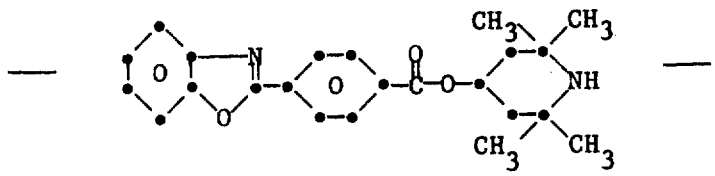

*Signed and Sealed this*

*Twenty-fifth* Day of *March 1980*

[SEAL]

Attest:

SIDNEY A. DIAMOND

Attesting Officer

Commissioner of Patents and Trademarks